United States Patent
Joshi et al.

(10) Patent No.: US 11,956,121 B1
(45) Date of Patent: Apr. 9, 2024

(54) METHOD AND SYSTEM FOR PRIVATE EDGE CLOUD MANAGER

(71) Applicant: Verizon Patent and Licensing Inc., Basking Ridge, NJ (US)

(72) Inventors: Medha Joshi, Sunnyvale, CA (US); Patricia R. Chang, San Ramon, CA (US); Yann Sendra, McLean, VA (US); John Patrick Hickey, III, Metuchen, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/049,663

(22) Filed: Oct. 26, 2022

(51) Int. Cl.
*H04L 41/0806* (2022.01)
*H04L 41/08* (2022.01)

(52) U.S. Cl.
CPC ...... *H04L 41/0806* (2013.01); *H04L 41/0886* (2013.01)

(58) Field of Classification Search
None
See application file for complete search history.

(56) References Cited

U.S. PATENT DOCUMENTS

| | | | | |
|---|---|---|---|---|
| 7,281,031 B1* | 10/2007 | Wang | ............... | H04L 12/4625 709/213 |
| 11,689,420 B1* | 6/2023 | Divesh | ............... | H04L 41/082 709/220 |
| 2011/0145657 A1* | 6/2011 | Bishop | ............... | G06F 11/3442 714/47.1 |
| 2022/0103526 A1* | 3/2022 | Niemi | ............... | H04L 41/0895 |
| 2022/0350675 A1* | 11/2022 | Navali | ............... | G06F 9/5072 |

* cited by examiner

*Primary Examiner* — Scott B Christensen

(57) ABSTRACT

A method, a network device, and a non-transitory computer-readable storage medium are described in relation to an edge cloud management service. The edge cloud management service may automate the provisioning, maintenance, supervision across multi-vendor network devices in a private/enterprise environment. Further, the edge cloud management service may provide abstraction and normalization services across multi-vendor components and enable KPI monitoring, location data, edge discovery metrics, end-to-end latency computation across various cloud service provider technologies.

20 Claims, 5 Drawing Sheets

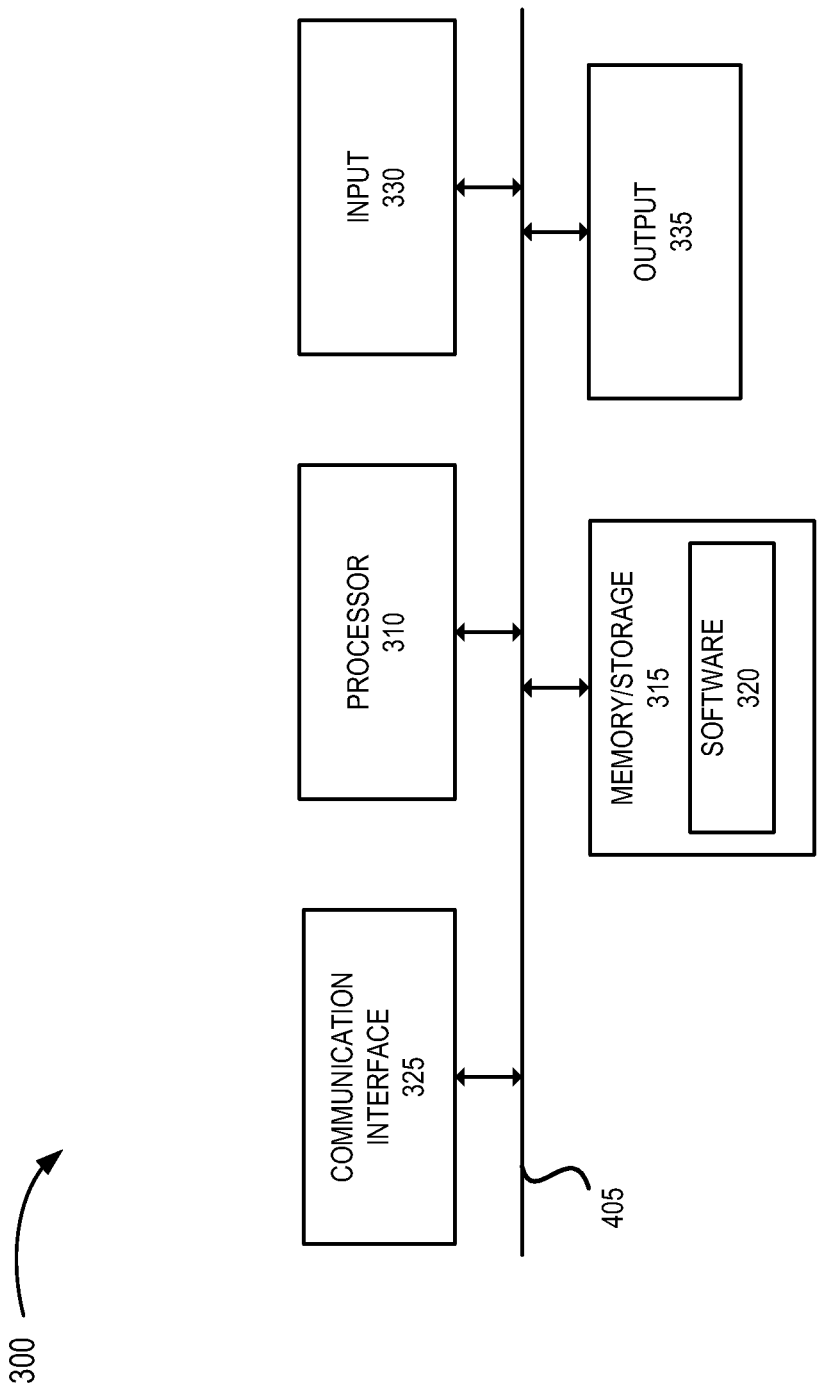

ns. Additionally,
given the dynamic nature of network performance over time,
the provisioning and management of resources in the network are equally challenging.

BRIEF DESCRIPTION OF THE DRAWINGS

FIG. 3 is a diagram illustrating exemplary components of a device that may correspond to one or more of the devices illustrated and described herein.

DETAILED DESCRIPTION

Figure 1:
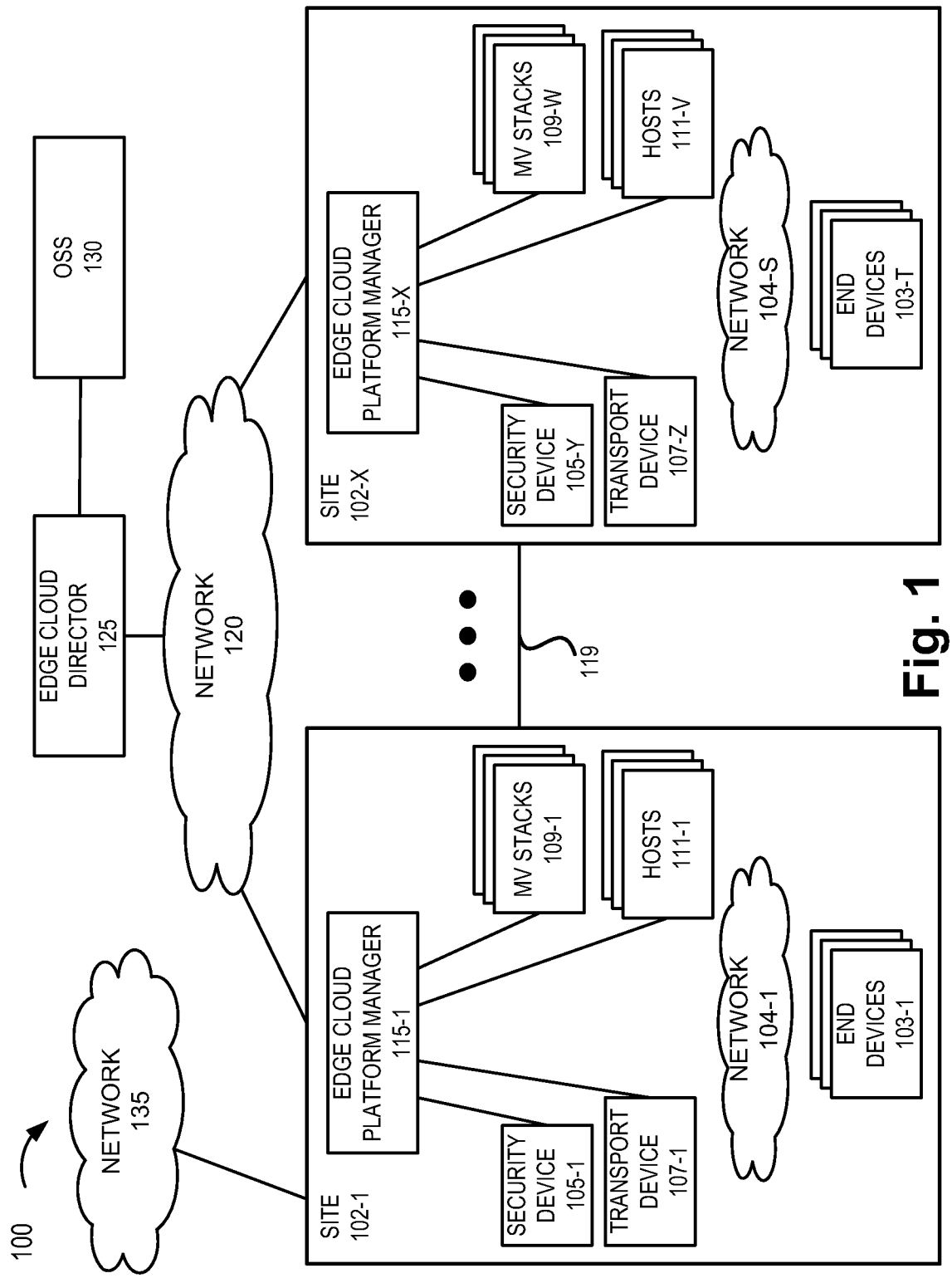
FIG. 1 is a diagram illustrating an exemplary environment in which an exemplary embodiment of an edge cloud management service may be implemented.

The following detailed description refers to the accompanying drawings. The same reference numbers in different drawings may identify the same or similar elements. Also, the following detailed description does not limit the invention.

Edge cloud systems, such as a private multi-access edge computing (MEC) platform or an edge cloud enterprise network (referred to as "private/enterprise edge cloud platform") may include various types of network devices. For example, the private/enterprise MEC platform may include a security device (e.g., firewall, etc.), a transport device (e.g., switch (e.g., top of rack (ToR), end of rack (EoR), router, relay, or the like), multi-vendor cloud stacks (e.g., applications, virtualizations, etc.), compute and storage servers that may host the multi-vendor cloud stacks, and other types of network devices that may support the private/enterprise edge cloud platform. Typically, these platforms may also be deployed with a private Fourth Generation (4G) and/or Fifth Generation (5G) network, such as Long Term Evolution (LTE), New Radio (NR), and/or another type of wireless network (e.g., WiFi, etc.).

However, current private/enterprise edge cloud systems lack supervisory intelligence to manage fundamental aspects of operation, such as configuration, performance monitoring, health and alarm management, benchmarking, upgrades, and the like, based on the many disparate and vendor-specific devices and/or other types of elements of the platform. For example, the private/enterprise edge cloud platform may include disparate and multi-vendor cloud stacks in which each cloud stack may use or ascribe to different nomenclature and terminology for key performance indicators (KPIs) and methods or operations to collect such network performance data, such as matured application programming interfaces (APIs), logs, database queriers, and the like. As a result, a private/enterprise edge cloud platform may not provide supervisory and managerial services that bind the components and provide a homogenous and cohesive system. For example, the private/enterprise edge cloud system may not provide automation services pertaining to activation, auto deployment of performance agents, abstracted benchmarking, performance collection and analysis, upgrading, rollback, patching, and other types of network management services.

According to exemplary embodiments, an edge cloud management service is described. According to an exemplary embodiment, the edge cloud management service may be implemented by an edge cloud director system and one or multiple edge cloud managers. According to an exemplary embodiment, the edge cloud director system may provide access and use of network resources to each edge cloud manager. For example, the network resources may include an Operations Support Systems (OSS) of a network provider or another type of entity. According to an exemplary embodiment, the edge cloud manager may include logic that provides supervisory and management edge cloud platform services, as described herein. For example, the edge cloud manager may holistically manage diversified cloud stacks and other components of the platform and enable automated control of various platform management and maintenance tasks.

In view of the foregoing, the edge cloud management service may enhance and automate the provisioning, maintenance, and supervision across multi-vendor network devices in a private/enterprise environment. For example, the edge cloud management service may automate the operation of a private/enterprise edge cloud platform with zero or minimal touch configuration as well as providing support for external applications and resources. Further, the edge cloud management service may provide abstraction and normalization services across multi-vendor components and enable KPI monitoring, location data, edge discovery metrics, end-to-end latency computation across various cloud service provider technologies, as described herein. Also, in contrast to public MEC/cloud managerial services, such services do not provide for "on premise edge cloud and enterprise network configurations." As such there are significant differences between edge cloud and public cloud in terms of physical capacity, initialization, networking, infrastructure, KPIs, and other characteristics pertaining to provisioning and operation. For example, the edge cloud may have extensive enterprise networking requirements while the public is normally connected using public networking infrastructure. Additionally, the edge cloud is fully owned and managed by the enterprise, for example, while the public cloud is owned and managed by the cloud service provider. As described herein, the edge cloud management service may manage an edge cloud platform and its functions in a vendor agnostic way.

FIG. 1 is a diagram illustrating an exemplary environment 100 in which an exemplary embodiment of an edge cloud management service may be implemented. As illustrated, environment 100 includes sites 102-1 through 102-X (also referred to collectively as sites 102, and individually or generally as site 102), a set of end devices 103-1 through 103-T (also referred to collectively as end devices 103, and individually or generally as end device 103), network 104-1 through 104-S (also referred to collectively as networks 104, and individually or generally as network 104), security device 105-1 through 105-Y (also referred to collectively as security devices 105, and individually or generally as security device 105), transport device 107-1 through 107-Z (also referred to collectively as transport devices 107, and individually or generally as transport device 107), multi-vendor (MV) stacks 109-1 through 109-W (also referred to collectively as MV stacks 109, and individually or generally as MV stack 109), hosts 111-1 through 111-V (also referred to collectively as hosts 111, and individually or generally as host 111), and edge cloud platform manager 115-1 through 115-X (also referred to collectively as edge cloud platform manager 115, and individually or generally as edge cloud platform manager 115). As further illustrated, environment 100 includes a network link 119, a network 120, an edge cloud director 125, an OSS 130, and a network 135.

The number, type, and arrangement of networks illustrated in environment 100 are exemplary. For example, according to other exemplary embodiments, environment 100 may include fewer networks, additional networks, and/or different networks. The number, type, and arrangement of network devices and end devices illustrated in environment 100 are exemplary.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud, edge, and/or another type of computing architecture.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Site 102 may be implemented as a private or enterprise location in which the edge cloud management service may be provided. For example, site 102 may host various network devices of an edge cloud and an enterprise network. As an example, site 102 may include a factory, a warehouse, a retail venue, a manufacturing plant, a hospital, and the like.

End device 103 may include a device that has communication capabilities (e.g., wireless, wired, optical, etc.). End device 103 may or may not have computational capabilities. End device 103 may be implemented as a mobile device, a portable device, a stationary device (e.g., a non-mobile device and/or a non-portable device), a device operated by a user, or a device not operated by a user. For example, end device 103 may be implemented as a smartphone, a mobile phone, a tablet, a wearable device (e.g., a watch, glasses, etc.), a video camera, a computer, an Internet of Thing (IoT) device, an industrial robot, a sensor device, or another type of user equipment (UE). End device 103 may be configured to execute various types of software (e.g., applications, programs, etc.). The number and the types of software may vary among end devices 103. For purposes of description, end device 103 is not considered a network device.

Network 104 may include one or multiple networks of one or multiple technologies. For example, network 104 may include a private access network. The private access network may include an access device, such as a next generation Node B (gNB), an evolved Long Term Evolution (eLTE), an evolved Node B (eNB), a small cell node (e.g., a picocell device, a femtocell device, a microcell device, etc.), a WiFi device, a WiMax device, and/or another suitable wireless and/or wired access device. Network 104 may include a private core network. For example, the private core network may include a packet gateway (PGW), a mobility management entity (MME), a home subscriber server (HSS), a serving gateway (SGW), a user plane function (UPF), an access and mobility management (AMF), a session management function (SMF), and/or another type of core device. Network 104 may include other types of networks, such as a virtual private network (VPN), a local area network (LAN), a wide area network (WAN), a cloud-based network, and so forth.

Security device 105 may include a firewall. For example, the firewall may be a standalone device, a virtual instance, and/or a next generation (NG) firewall. The firewall may provide intrusion prevention, web filtering, secure sockets layer (SSL) inspection, automatic threat protection, application-based traffic classification, malware and/or ransomware identification/protection, artificial intelligence (AI), among other security-based logic pertaining to inbound and outbound traffic. Security device 105 may include other types of security devices, such as an authentication device, an authorization device. According to an exemplary embodiment, security device 105 may be provisioned and managed according to the edge cloud management service. For example, the firewall may be subject to the edge cloud management service of edge cloud platform manager 115 and edge cloud director 125, as described herein.

Transport device 107 may include a switch, such as a ToR switch or an EoR switch. The switch may provide switching for traffic associated with network devices at site 102. The switch may also support security, automation (e.g., event correlation, proactive anomaly detection, etc.), analytics (e.g., AI, machine learning (ML), performance monitoring, etc.), and may route traffic to and from end devices 103. Transport device 107 may include other types of transport devices, as described herein. According to an exemplary embodiment, transport device 107 may be provisioned and managed according to the edge cloud management service. For example, an enterprise network switch may be subject to the edge cloud management service of edge cloud platform manager 115 and edge cloud director 125, as described herein.

MV stacks 109 may include cloud service provider (CSP) and wireless stack software. For example, MV stacks 109 may include virtualization technology (e.g., container, virtual machine, etc.) and applications that may be hosted. By way of further example, MV stacks 109 may include a multi-vendor environment, such as AWS OUTPOSTS™, MICROSOFT™ Azure Stack Edge, GOOGLE™ Edge Cloud, and/or another similar type of stack, as well as a wireless stack, such as Wi-Fi 6, ERICSSON™ Network on Wheels (NoW), and/or another similar type of communication stack. MV stacks 109 may also include applications. For example, the applications may include business applications, mission critical applications, cloud applications, and/or other types of software. According to an exemplary embodiment, MV stacks 109 may be provisioned and managed according to the edge cloud management service. For example, MV stack 109 may be subject to the edge cloud management service of edge cloud platform manager 115 and edge cloud director 125, as described herein.

Host 111 may include a host device, such as a computer, for example. Host 111 may include various hardware (e.g., processor, memory, storage, communication interface, etc.). Host 111 may include software, such as an operating system (OS).

Edge cloud platform manager 115 may include a network device that includes logic of an exemplary embodiment of the edge cloud management service, as described herein. For example, edge cloud platform manager 115 may bind and supervise different components of an edge cloud system with enterprise network devices, such as security device 105, transport device 107, MV stacks 109, and hosts 111. Edge cloud platform manager 115 may automate configuration of the network devices including, for example, the configuration and lifecycle of an initial build pertaining to the network devices, setup a virtual private cloud, performance agents, and other facets of the edge cloud management service, as described herein. Additionally, for example, edge cloud platform manager 115 may provide semantic normalization or abstraction pertaining to various MV stacks 109, which may pertain to KPI monitoring, location data, edge discovery metrics and data, end-to-end latency computation, and other performance metric parameters and values. Edge cloud platform manager 115 may also provide alarm and health monitoring and management, upgrading, patching, and rollbacks for the network devices. The edge cloud management service may be implemented without dependency on an external device, system, and/or network to automate, orchestrate, provision, and manage the network devices of site 102, such as security device 105, transport device 107, MV stacks 109, host 111, and so forth. Edge cloud platform manager 115 is described further herein.

Network link 119 may support communication between sites 102. For example, network link 119 may include a wide area network (WAN) and/or another type of suitable network. Network 120 may include a data network that may support communication between sites 102 and edge cloud director 125/OSS 130.

Edge cloud director 125 may include a network device that includes logic of an exemplary embodiment of the edge cloud management service, as described herein. For example, edge cloud director 125 may manage and supervise edge cloud platform manager 115, which may combine enterprise network and private cloud. Edge cloud director 125 may communicate with edge cloud platform manager 115 via network 120. For example, edge cloud director 125 may include a server that communicates with multiple clients of edge cloud platform managers 115 using various protocols (e.g., WebSocket, gRPC Remote Procedure Calls, or the like). Edge cloud director 125 may publish, such as normalized KPIs and/or other types of information associated with a site 102, based on an application programming interface (API) service to OSS 130. The published or exposed information may permit other upstream systems, networks, and applications, access, and use of such information.

OSS 130 may include a computer system of a service provider that may manage a network. For example, OSS 130 may include hardware and software tools that provide for the monitoring, controlling, analyzing, and managing of a network. OSS 130 may publish information pertaining to site 102. For example, the information may be provided to a service or a message bus and made available to third party devices, applications, and/or entities, as described herein.

Network 135 may include a public network, the Internet, a packet data network (PDN), a service provider network, the World Wide Web (WWW), an Internet Protocol Multimedia Subsystem (IMS) network, a public cloud network, a Rich Communication Service (RCS) network, a software-defined (SD) network, a virtual network, a data center, a data network, or other type of network that may provide access to and/or may host applications and/or services.

Figure 2:
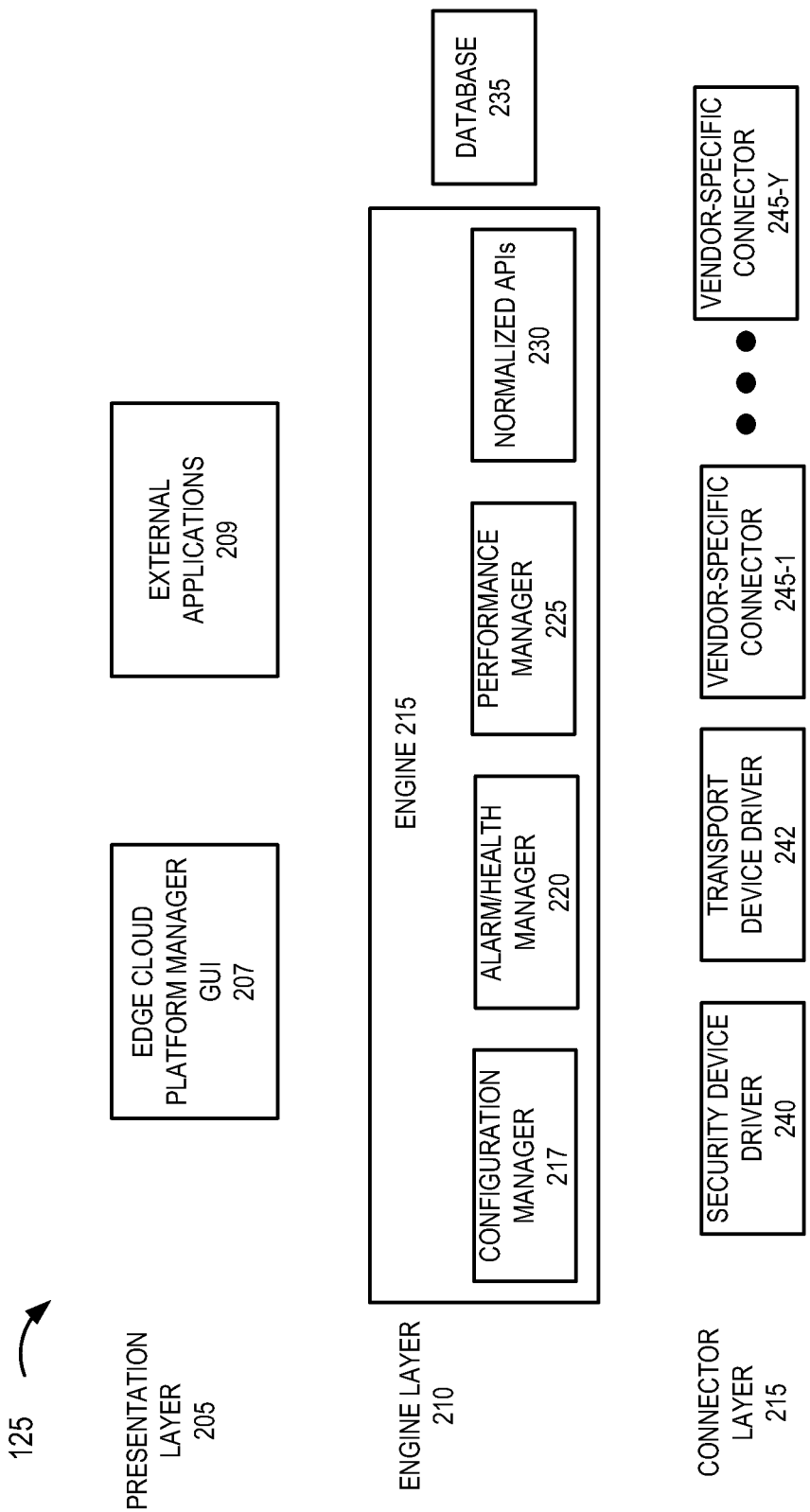
FIG. 2 is a diagram illustrating exemplary components of an edge cloud platform manager device that provides an exemplary embodiment of the edge cloud management service.

FIG. 2 is a diagram illustrating exemplary components of an exemplary embodiment of edge cloud platform manager 125. For purposes of description, edge cloud platform manager 125 includes a presentation layer 205, an engine layer 210, and a connector layer 215. According to other exemplary embodiments, edge cloud platform manager 125 may include additional, different, and/or fewer layers and/or components therein.

Referring to FIG. 2, presentation layer 205 may include an edge cloud platform manager graphical user interface (GUI) 207 and external applications 209. Edge cloud platform manager GUI 207 may enable a user (not illustrated) to configure, control, manage network devices of site 102. Edge cloud platform manager GUI 207 may permit the user to change an existing configuration (e.g., associated with an automated configuration). Additionally, edge cloud platform manager GUI 207 may enable the user to view configurations, states, performance metrics, and other types of operational information pertaining to site 102. External applications 209 may include access and use of external applications (e.g., relative to site 102).

Engine layer 210 may include an engine 215 and a database 235. As further illustrated, engine 215 may include a configuration manager 217, an alarm/health manager 220, a performance manager 225, and normalized APIs 230.

Engine 215 may include a network device that provides various network services of the edge cloud management service, as described herein. Engine 215 may include logic that provides various managerial and supervisory tasks relative to the network services. According to some exemplary embodiments, engine 215 may include AI and/or ML logic that may enable optimization regarding configuration, as well as other operational characteristics, such as performance metrics, KPIs, and so forth. Engine 215 may interface and coordinate with components of engine 215, such as configuration manager 217, alarm/health manager 220, performance manager 225, normalized APIs 230, edge cloud platform manager GUI 207, among other components, as described herein.

Configuration manager 217 may provide initial configuration and setup of network devices of site 102 including security device 105, transport device 107, MV stacks 109, and hosts 111, for example, as described herein. The configuration and provisioning of the network devices may be fully automated. Configuration manager 217 may obtain configuration files, profiles, and other types of information from database 235. Configuration manager 217 may determine for a given network device a normalization or abstraction pertaining to the operation of the network device so that proper network configurations may be provisioned and configured. For example, each stack among MV stacks 109 may use different nomenclatures, parameters, and/or configuration settings, in whole or in part, that may be associated each stack. As described herein, configuration manager 217 may normalize or abstract those differences and provide a unified system. For example, configuration manager 217 may provide a semantic normalization of the cloud KPIs across the MV stacks 109 and hosts 111.

Additionally, configuration manager 217 may automate the configuration of other network devices. For example, regarding transport device 107, the networking may be divided into WAN and private LAN. The private LAN may be responsible for networking between various network devices of site 120. The WAN may depend on the entity associated with site 102. For example, the WAN may connect multiple sites 102. The automation of the private LAN may be facilitated by way of standardizing cabling, addressing space and VLAN scheme. Further, the configuration of transport device 107, such as a ToR switch, may depend on each stack of MV stacks 109. As stated above, the differences in MV stacks 109 may be abstracted using a normalization procedure to form a common and standardized configuration. Configuration manager 217 may install and manage transport device driver 242 relative to transport device 107. Configuration manager 217 may support various protocols, such as Command Line Interface (CLI), Ansible, Network Configuration Protocol (NETCONF), Yet Another Next Generation (YANG) protocol, for example.

Alarm/health manager 220 may include a network device that provides alarm and health services related to the network devices of site 102. For example, alarm/health manager 220 may identify various events and activate an alarm or provide another type of notification. Alarm/health manager 220 may provide a remedial measure that addresses an event. Alarm/health manager 220 may provide health monitoring related to the network devices of site 102. For example, alarm/health manager 220 may provide antivirus, malware, and other health-related services.

Performance manager 225 may provision performance agents on the cloud servers. For example, the performance agents may collect KPIs associated with MV stacks 109. As described herein, cloud service providers may use different methodologies to get KPIs, such as database queries, logs, and matured APIs. Normalized KPIs may be sent to edge cloud director 125 using WebSocket, for example, for publishing on the service or message bus of OSS 130. The performance agents may collect benchmark metrics (e.g., latency, jitter, bandwidth, traffic throughput, or another performance metric parameter), which may uniformly apply across all MV stacks 109. For example, performance manager 225 may embed and automate metrics collection of edge cloud platform. The metric collection may be configurable in terms of time period and polling interval. The metric and benchmarking collection may be provided to GUI 207 and enable a user a visual and timeseries performance perspective of network performance. Performance manager 225 may also collect KPIs of the edge cloud using network 135. Edge cloud platform manager 115 may use details of the edge cloud platform, such as identifier subscription details for identification and authentication purposes.

Normalized APIs 230 may include APIs that provide connection and communication with the network devices of site 102. For example, normalized APIs 230 may be used for configuration, KPI monitoring and collection, upgrading, and other tasks, as described herein. For example, normalized APIs 230 may interface with MV stacks 109, and so forth.

Database 235 may provide storage and data management services. Database 235 may store configuration files, log files, and procedures that may relate to an initial configuration setup and other tasks pertaining to the operation of network devices in site 107, as described herein.

Connection layer 215 may include security device driver 240, transport device driver 242, and vendor-specific connectors 245-1 through 245-Y (also referred to collectively as vendor-specific connectors 245, and individually or generally as vendor-specific connector 245).

Security device driver 240 may include a driver for security device 105. Transport device driver 242 may include a driver for transport device 107. Vendor-specific connector 245 may include an API and/or another type of interface that enables communication with a stack (or sub-element) of the stack. As an example, each stack of a vendor may have a particular interface for purposes of communication, configuration, provisioning, updating, and so forth.

FIG. 3 is a diagram illustrating exemplary components of a device 300 that may be included in one or more of the devices described herein. For example, device 300 may correspond to access device 107, external device 117, core device 122, network performance device 125, network provisioning device 127, end device 130, AI/ML system 205, NWDAF 220, crowd sourced device 225, testing device 230, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to AI/ML system 205, software 320 may include an application that, when executed by processor 310, provides a function and/or a process of edge cloud management service, as described herein. Additionally, for example, with reference to network provisioning device 127, software 320 may include an application that, when executed by processor 310, provides a function and/or a process of edge cloud management service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4A:
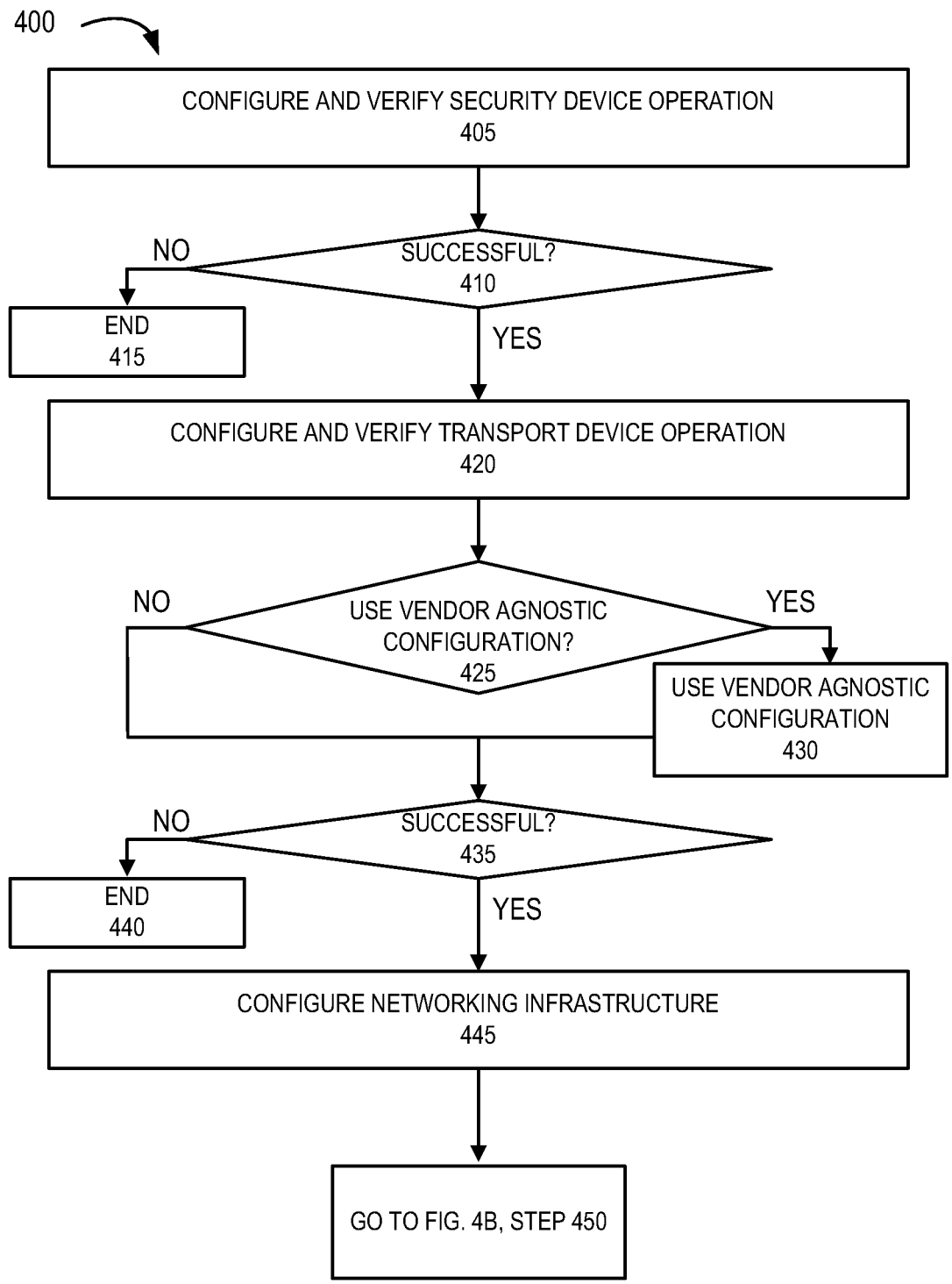
FIGS. 4A and 4B are flow diagrams illustrating an exemplary process of an exemplary embodiment of the edge cloud management service.
Figure 4B:
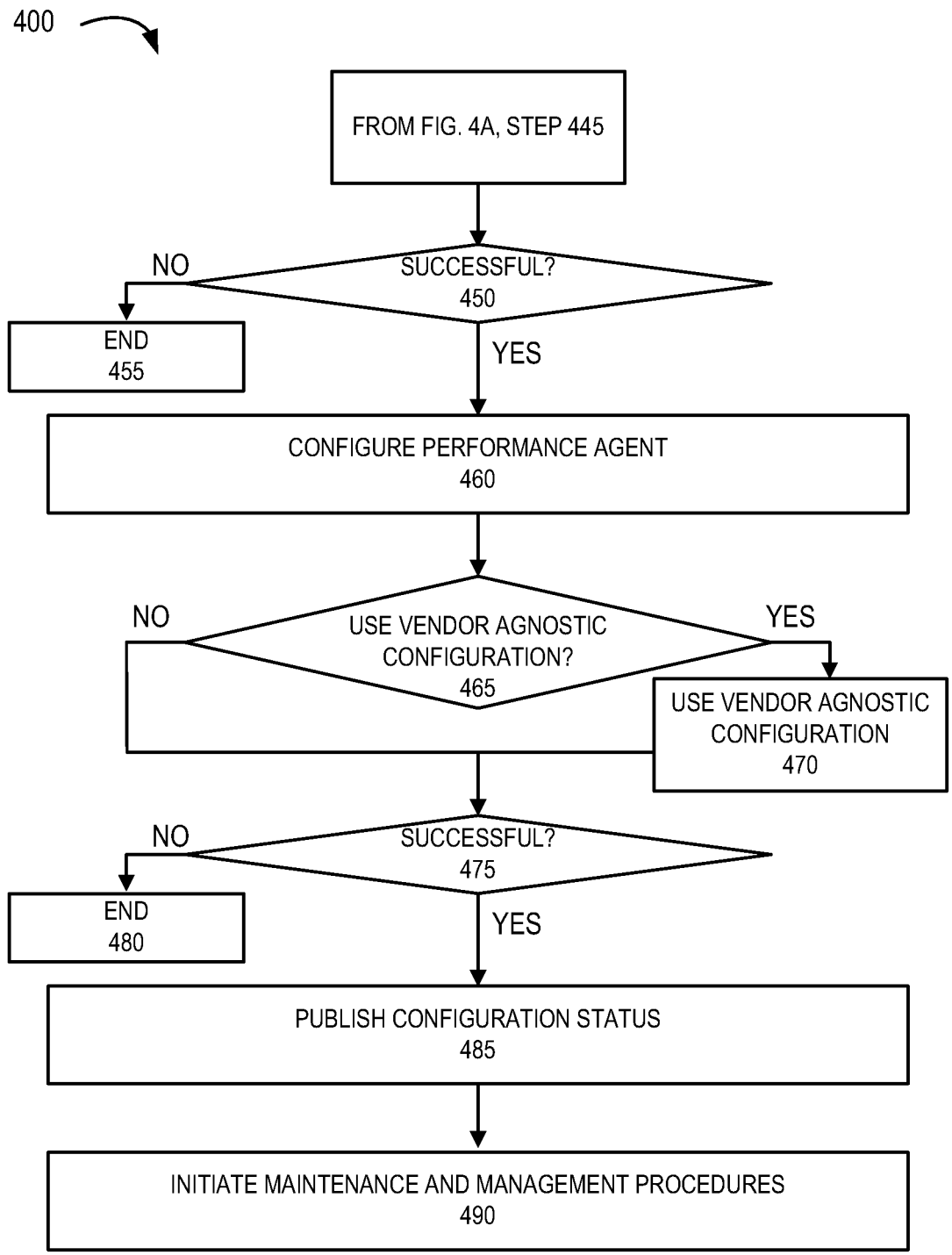

FIGS. 4A and 4B are a flow diagram illustrating an exemplary process 400 of an exemplary embodiment of the edge cloud management service. According to an exemplary embodiment, edge cloud platform manager 115 may perform a step of process 400. According to an exemplary implementation, processor 310 executes software 320 to perform a step of process 400, as described herein. Alternatively, a step may be performed by execution of only hardware.

According to an exemplary embodiment, edge cloud platform manager 115 may begin process 400 upon power up. As a part of an initial configuration setup for network devices of site 102, edge cloud platform manager 115 may create a log or journal pertaining to the initial setup, record verified successes and any failures that may occur. Edge cloud platform manager 115 may store the log or journal in database 235.

In block 405, edge cloud platform manager 115 may configure and verify security device operation. For example, edge cloud platform manager 115 may configure a firewall, which may include using security device driver 240. The firewall may also be configured with a predefined route via network 120 to enable a remote connection to a controller server. The firewall may download and set up its configuration. Once the remote configuration is completed, in block 410, edge cloud platform manager 115 may verify whether the configuration is successful or not. For example, edge cloud platform manager 115 may check if the interfaces and operation of the firewall are correct. If edge cloud platform manager 115 determines that the configuration is not successful (block 410—NO), edge cloud platform manager 115 may perform a predefined number of retries before activating a failure alarm to alarm/health manager 220. Process 400 may end (block 415). Edge cloud platform manager 115 may log the failure events, retry information, etc. If edge cloud platform manager 115 determines that the configuration is successful (block 410—YES), edge cloud platform manager 115 may optionally verify that WAN access is correctly configuration.

In block 420, edge cloud platform manager 115 may configure and verify transport device operation. For example, edge cloud platform manager 115 may configure a switch, which may include using transport device driver 242 to enable LAN access. As a part of the initial configuration, in block 425, edge cloud platform manager 115 may determine whether to use a vendor agnostic configuration. For example, depending on the stack of a particular vendor, there may be differences in its configuration that may need to be abstracted to enable common/standardized configuration elements across all of the MV stacks 209. Edge cloud platform manager 115 may make this determination based on a setup procedure, which may be stored in database 235 and/or provided by configuration manager 217. When edge cloud platform manager 115 determines to use vendor agnostic configuration (block 425—YES), then vendor agnostic configuration may be used (block 430). According to some exemplary embodiments, the setup procedure, which may include abstraction/normalization, may be auto generated based on standardizing IP addressing and VLAN scheme.

Otherwise, edge cloud platform manager 115 may proceed to block 435, in which edge cloud platform manager 115 may verify whether the configuration is successful or not. For example, edge cloud platform manager 115 may check if the interfaces and operation of the switch are correct. If edge cloud platform manager 115 determines that the configuration is not successful (block 435—NO), edge cloud platform manager 115 may perform a predefined number of retries before activating a failure alarm to alarm/health manager 220. Process 400 may end (block 440). Edge cloud platform manager 115 may log the failure events, retry information, etc. If edge cloud platform manager 115 determines that the configuration is successful (block 435—YES), edge cloud platform manager 115 may configure network infrastructure-related configurations (block 445). For example, the network infrastructure configurations may include setting security groups, inbound/outbound rules, VPC subnets, internet gateways, network address translation, among other networking configurations. Edge cloud platform manager 115 may use vendor-specific connectors 245 that may correspond to an MV stack of MV stacks 209.

Referring to FIG. 4B, edge cloud platform manager 115 may proceed to block 450, in which edge cloud platform manager 115 may verify whether the configuration is successful or not. For example, edge cloud platform manager 115 may check whether network infrastructure configurations have been successfully configured. If edge cloud platform manager 115 determines that the configuration is not successful (block 455—NO), edge cloud platform manager 115 may perform a predefined number of retries before activating a failure alarm to alarm/health manager 220. Process 400 may end (block 455). Edge cloud platform manager 115 may log the failure events, retry information, etc. If edge cloud platform manager 115 determines that the configuration is successful (block 455—YES), edge cloud platform manager 115 may configure performance agents on the hosts 111 (block 460).

As a part of the initial configuration, in block 465, edge cloud platform manager 115 may determine whether to use a vendor agnostic configuration. For example, depending on the stack of a particular vendor, there may be differences in its configuration that may need to be abstracted to enable common/standardized configuration elements across all of the MV stacks 209. Edge cloud platform manager 115 may make this determination based on a setup procedure, which may be stored in database 235 and/or provided by configuration manager 217. When edge cloud platform manager 115 determines to use vendor agnostic configuration (block 470—YES), then vendor agnostic configuration may be used (block 470). According to some exemplary embodiments, the setup procedure, which may include abstraction/normalization, may be auto generated.

As an example, different stacks may use different methodologies to get KPIs such as databases, logs, emails, and APIs. To make logic in upstream systems uniform and cloud service provider (CSP) agnostic, normalized APIs 230 for obtaining KPIs may be used. By way of example, a KPI may be semantically normalized. For example, a KPI (e.g., "connected status" of AWS OUTPOSTS™ may be equivalent to a KPI (e.g., "cloud_network_in_bytes") of MICROSOFT™ Azure Stack Edge. According to an exemplary implementation, semantic normalization may use subset and superset algorithms to normalize KPIs, for example.

Otherwise, edge cloud platform manager 115 may proceed to block 475, in which edge cloud platform manager 115 may verify whether the configuration is successful or not. For example, edge cloud platform manager 115 may check if the performance agents are operational, such as providing performance metric monitoring and KPI value collection. If edge cloud platform manager 115 determines that the configuration is not successful (block 475—NO), edge cloud platform manager 115 may perform a predefined number of retries before activating a failure alarm to alarm/health manager 220. Process 400 may end (block 480). If edge cloud platform manager 115 determines that the configuration is successful (block 475—YES), edge cloud platform manager 115 may publish the configuration status (block 485). For example, edge cloud platform manager 115 may provide the configuration status to edge cloud platform manager GUI 207 and transmit the configuration information to edge cloud director 125 for publication via OSS 130.

In block 490, edge cloud platform manager 115 may initiate maintenance and management procedures. For example, edge cloud platform manager 115 may monitor network performance, perform benchmarking, upgrades, rollbacks, provide health and alarm services, and/or other tasks that support the operation of site 102.

FIGS. 4A ad 4B illustrate an exemplary process of the edge cloud management service, according to other exemplary embodiments, the edge cloud management service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method for automating initial configuration of components of a private edge cloud network with zero or minimal touch configuration, comprising:
    managing, by a network device of the private edge cloud network, an initial configuration of a security device of the private edge cloud network based on a first automated procedure that initiates and supervises the initial configuration of the security device;
    managing, by the network device responsive to successful completion of the first automated procedure, an initial configuration of a switch of the private edge cloud network based on a second automated procedure that initiates and supervises the initial configuration of the switch,
        wherein the second automated procedure includes an abstraction procedure pertaining to configuration differences between two or more different multi-vendor cloud server stacks associated with multi-vendor cloud servers of the private edge cloud network,
        wherein the initial configuration of the switch is vendor agnostic relative to the two or more different multi-vendor cloud server stacks, and
        wherein the abstraction procedure is generated, by the network device, based on standardizing network addressing and a virtual local area network scheme;
    managing, by the network device responsive to successful completion of the second automated procedure, an initial configuration of a network infrastructure of the private edge cloud network based on a third automated procedure that initiates and supervises the initial configuration of the network infrastructure; and
    managing, by the network device responsive to successful completion of the third automated procedure, an initial configuration of performance agents across the multi-vendor cloud servers based on a fourth automated procedure that initiates and supervises the initial configuration of the performance agents,
        wherein the fourth automated procedure includes semantic normalization associated with one or more key performance indicators pertaining to the two or more different multi-vendor cloud server stacks.

2. The method of claim 1, further comprising:
    verifying, by the network device, whether the initial configuration of the security device and the switch are successful; and
    causing, by the network device, an alarm or a notification when the initial configuration of at least one of the security device or the switch is unsuccessful.

3. The method of claim 1, wherein the initial configuration of the network infrastructure of the private edge cloud network includes two or more of setting security groups, assigning inbound and outbound rules, virtual subnets, or network address translation.

4. The method of claim 1, wherein the second automated procedure comprises:
    determining, by the network device, whether to use a vendor agnostic configuration pertaining to the switch and the two or more different multi-vendor cloud server stacks; and
    using, by the network device, the vendor agnostic configuration.

5. The method of claim 1, further comprising:
    initiating, by the network device after the fourth automated procedure, maintenance of the security device, the switch, and the multi-vendor cloud servers, wherein the maintenance includes upgrading, rolling back, and benchmarking.

6. The method of claim 1, wherein the first automated procedure comprises:
    causing, by the network device, the security device to download the initial configuration from a server external from the private cloud edge network via a pre-defined network path.

7. The method of claim 1, wherein the abstraction procedure further normalizes differences in configuration settings between the two or more different multi-vendor cloud server stacks and produces common configuration elements among the multi-vendor cloud servers.

8. The method of claim 1, further comprising:
    providing, by the network device, a graphical user interface that enables a user to alter a completed configuration associated with any of the first, second, third, and fourth automated procedures.

9. A network device for automating initial configuration of components of a private edge cloud network with zero or minimal touch configuration comprising:
a processor that is configured to:
manage an initial configuration of a security device of the private edge cloud network based on a first automated procedure that initiates and supervises the initial configuration of the security device, wherein the network device is of the private edge cloud network;
manage, responsive to successful completion of the first automated procedure, an initial configuration of a switch of the private edge cloud network based on a second automated procedure that initiates and supervises the initial configuration of the switch,
wherein the second automated procedure includes an abstraction procedure pertaining to configuration differences between two or more different multi-vendor cloud server stacks associated with multi-vendor cloud servers of the private edge cloud network,
wherein the initial configuration of the switch is vendor agnostic relative to the two or more different multi-vendor cloud server stacks, and
wherein the abstraction procedure is generated, by the network device, based on standardizing network addressing and a virtual local area network scheme;
manage, responsive to successful completion of the second automated procedure, an initial configuration of a network infrastructure of the private edge cloud network based on a third automated procedure that initiates and supervises the initial configuration of the network infrastructure; and
manage, responsive to successful completion of the third automated procedure, an initial configuration of performance agents across the multi-vendor cloud servers based on a fourth automated procedure that initiates and supervises the initial configuration of the performance agents,
wherein the fourth automated procedure includes semantic normalization associated with one or more key performance indicators pertaining to the two or more different multi-vendor cloud server stacks.

10. The network device of claim 9, wherein the processor is further configured to:
verify whether the initial configuration of the security device and the switch are successful; and
cause an alarm or a notification when the initial configuration of at least one of the security device or the switch is unsuccessful.

11. The network device of claim 9, wherein the initial configuration of the network infrastructure of the private edge cloud network includes two or more of setting security groups, assigning inbound and outbound rules, virtual subnets, or network address translation.

12. The network device of claim 9, wherein, when performing the second automated procedure, the processor is further configured to:
determine whether to use a vendor agnostic configuration pertaining to the switch and the two or more different multi-vendor cloud server stacks; and
use the vendor agnostic configuration.

13. The network device of claim 9, wherein the processor is further configured to:
initiate, after the fourth automated procedure, maintenance of the security device, the switch, and the multi-vendor cloud servers, wherein the maintenance includes upgrading, rolling back, and benchmarking.

14. The network device of claim 9, wherein, when performing the first automated procedure, the processor is further configured to:
cause the security device to download the initial configuration from a server external from the private cloud edge network via a predefined network path.

15. The network device of claim 9, wherein the abstraction procedure further normalizes differences in configuration settings between the two or more different multi-vendor cloud server stacks and produces common configuration elements among the multi-vendor cloud servers.

16. The network device of claim 9, wherein the processor is further configured to:
provide a graphical user interface that enables a user to alter a completed configuration associated with any of the first, second, third, and fourth automated procedures.

17. A non-transitory computer-readable storage medium storing instructions executable by a processor of a network device for automating initial configuration of components of a private edge cloud network with zero or minimal touch configuration, wherein the instructions are configured to:
manage an initial configuration of a security device of the private edge cloud network based on a first automated procedure that initiates and supervises the initial configuration of the security device, wherein the network device is of the private edge cloud network;
manage, responsive to successful completion of the first automated procedure, an initial configuration of a switch of the private edge cloud network based on a second automated procedure that initiates and supervises the initial configuration of the switch,
wherein the second automated procedure that includes an abstraction procedure pertaining to configuration differences between two or more different multi-vendor cloud server stacks associated with multi-vendor cloud servers of the private edge cloud network,
wherein the initial configuration of the switch is vendor agnostic relative to the two or more different multi-vendor cloud server stacks, and
wherein the abstraction procedure is generated, by the network device, based on standardizing network addressing and a virtual local area network scheme;
manage, responsive to successful completion of the second automated procedure, an initial configuration of a network infrastructure of the private edge cloud network based on a third automated procedure that initiates and supervises the initial configuration of the network infrastructure; and
manage, responsive to successful completion of the third automated procedure, an initial configuration of performance agents across the multi-vendor cloud servers based on a fourth automated procedure that initiates and supervises the initial configuration of the performance agents,
wherein the fourth automated procedure includes semantic normalization associated with one or more key performance indicators pertaining to the two or more different multi-vendor cloud server stacks.

18. The non-transitory computer-readable storage medium of claim 17, wherein the instructions are further configured to:
verify whether the initial configuration of the security device and the switch are successful; and cause an alarm or a notification when the initial configuration of at least one of the security device or the switch is unsuccessful.

19. The non-transitory computer-readable storage medium of claim 17, wherein the instructions are further configured to:
initiate, after the fourth automated procedure, maintenance of the security device, the switch, and the multi-vendor cloud servers, wherein the maintenance includes upgrading, rolling back, and benchmarking.

20. The non-transitory computer-readable storage medium of claim 17, wherein the instructions are further configured to:
provide a graphical user interface that enables a user to alter a completed configuration associated with any of the first, second, third, and fourth automated procedures.

* * * * *